US012792831B2

(12) United States Patent
Zhang et al.

(10) Patent No.: US 12,792,831 B2
(45) Date of Patent: Nov. 10, 2026

(54) TEXT RECOGNITION METHOD, AND MODEL AND ELECTRONIC DEVICE

(71) Applicant: BOE Technology Group Co., Ltd., Beijing (CN)

(72) Inventors: Pengfei Zhang, Beijing (CN); Chao Ji, Beijing (CN); Boran Jiang, Beijing (CN); Ge Ou, Beijing (CN); Chuqian Zhong, Beijing (CN); Shuqi Wei, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 274 days.

(21) Appl. No.: 18/638,457

(22) Filed: Apr. 17, 2024

(65) Prior Publication Data

US 2024/0320428 A1 Sep. 26, 2024

Related U.S. Application Data

(63) Continuation of application No. PCT/CN2022/120222, filed on Sep. 21, 2022.

(51) Int. Cl.
*G06K 9/00* (2022.01)
*G06F 40/279* (2020.01)
*G06V 30/19* (2022.01)

(52) U.S. Cl.
CPC ........ *G06F 40/279* (2020.01); *G06V 30/1912* (2022.01); *G06V 30/19127* (2022.01); *G06V 30/1916* (2022.01)

(58) Field of Classification Search
CPC ........ G06F 40/279; G06F 16/35; G06F 18/00; G06V 30/1912; G06V 30/19127; G06V 30/1916
See application file for complete search history.

(56) References Cited

U.S. PATENT DOCUMENTS 5,854,855 A * 12/1998 Errico .................. G06V 30/153 382/187
6,205,247 B1 * 3/2001 Breuer ................ G06F 18/2453 382/156

(Continued)

FOREIGN PATENT DOCUMENTS

CN 109614484 A 4/2019
CN 110765757 A 2/2020

(Continued)

*Primary Examiner* — Avinash Yentrapati
(74) *Attorney, Agent, or Firm* — IPro, PLLC

(57) ABSTRACT

Provided in the present disclosure are a text recognition method, and a model and an electronic device, which are applied to a mode in which primary classification is first performed from different dimensions, and secondary classification is then performed, such that the meaning of text is analyzed from different dimensions, thereby improving the accuracy of text recognition. The method includes: acquiring text to be recognized, and performing primary classification on the text to obtain a plurality of text features, wherein the primary classification is used for performing feature extraction on the text from different dimensions, and there are differences between features extracted from the different dimensions (100); splicing the plurality of text features, so as to obtain spliced features (101); and performing secondary classification on the spliced features to obtain a text category corresponding to the text, wherein the secondary classification is used for classifying the spliced features (102).

17 Claims, 4 Drawing Sheets

(56) References Cited

U.S. PATENT DOCUMENTS

| | | | | |
|---|---|---|---|---|
| 9,576,196 | B1 * | 2/2017 | Natarajan | G06V 20/63 |
| 11,721,015 | B2 * | 8/2023 | Yang | G06N 3/0442 382/128 |
| 2005/0251347 | A1 * | 11/2005 | Perona | G06V 20/693 382/128 |
| 2019/0179896 | A1 * | 6/2019 | Anisimovich | G06F 18/217 |
| 2021/0209401 | A1 * | 7/2021 | Zhang | G06F 18/2413 |
| 2022/0237403 | A1 * | 7/2022 | Zhou | G06F 18/25 |
| 2022/0300735 | A1 * | 9/2022 | Kelly | G06F 16/93 |
| 2023/0154163 | A1 * | 5/2023 | Jia | G06V 10/776 382/159 |
| 2023/0177400 | A1 * | 6/2023 | Dal Mutto | G06N 3/04 382/165 |
| 2023/0260304 | A1 * | 8/2023 | Wang | G06V 10/82 382/100 |
| 2025/0131756 | A1 * | 4/2025 | Huang | G06V 30/19173 |

FOREIGN PATENT DOCUMENTS

| | | | |
|---|---|---|---|
| CN | 113342933 | A | 9/2021 |
| CN | 114817548 | A | 7/2022 |
| CN | 114969316 | A | 8/2022 |
| KR | 20220127189 | A | 9/2022 |
| WO | 2021135446 | A1 | 7/2021 |
| WO | 2022142593 | A1 | 7/2022 |

* cited by examiner

TEXT RECOGNITION METHOD, AND MODEL AND ELECTRONIC DEVICE

CROSS-REFERENCE TO RELATED APPLICATIONS

This application is a continuation of International Application No. PCT/CN2022/120222, filed on Sep. 21, 2022, which is hereby incorporated by reference in its entirety.

TECHNICAL FIELD

The present disclosure relates to the technical field of natural language processing, and in particular to a text recognition method, a text recognition model and an electronic device.

BACKGROUND

Text recognition is the key to the composition of a man-machine dialogue system. Users can perform "Dialog Act" with the system by inputting a text, such as inquiring about weather, booking hotels, etc. "Conversation behavior" refers to the behavior that the state or context of the information shared by users in the conversation is constantly updated.

Text recognition is also called text classification, that is, the text is classified into previously defined text categories according to the domain and meaning of the text input by the user. There are some characteristics in text recognition, such as less annotation data, non-standard user expression, implicit and diversity of the text, etc. Therefore, the accuracy of traditional text recognition is generally low.

SUMMARY

The present disclosure provides a text recognition method, a text recognition model and an electronic device, for analyzing meaning of a text from different dimensions by first performing primary classification of different dimensions and then performing secondary classification, to improve the accuracy of text recognition.

In a first aspect, an embodiment of the present disclosure provides a text recognition method, the method including:

- acquiring a to-be-recognized text, performing primary classification on the to-be-recognized text to obtain a plurality of text features, where the primary classification is configured to perform feature extraction on the to-be-recognized text from different dimensions, and features extracted from different dimensions have differences;
- splicing the plurality of text features to obtain a spliced feature; and
- performing secondary classification on the spliced feature to obtain a text category corresponding to the to-be-recognized text, where the secondary classification is configured to classify the spliced feature.

As an optional embodiment, the to-be-recognized text is input into a plurality of first classifiers in a text recognition model for primary classification, to output the plurality of text features, where one of the first classifiers outputs one of the text features; the spliced feature obtained by splicing the plurality of text features is input into a second classifier in the text recognition model for secondary classification, to output the text category corresponding to the to-be-recognized text.

As an optional embodiment, any one of the first classifiers is determined based on a meta-classifier, where the plurality of first classifiers respectively correspond to local parameter spaces of different dimensions in a meta-parameter space of the meta-classifier; the meta-classifier includes an encoder for encoding a text to obtain a text encoding feature.

As an optional embodiment, the plurality of first classifiers are obtained by training local parameter spaces of different dimensions in the meta-parameter space of the meta-classifier using a training set.

As an optional embodiment, in a training process, local parameter spaces of different dimensions in the meta-parameter space are adjusted based on a loss function value, and when a parameter set obtained by the adjusting is an optimal parameter set, first classifiers respectively corresponding to the local parameter spaces of different dimensions are obtained.

As an optional embodiment, the loss function value is determined by:

- inputting each training text sequence in the training set to the meta-classifier, to output a plurality of training text categories corresponding to the each training text sequence;
- determining the loss function value according to the plurality of training text categories and a plurality of marked text categories corresponding to the each training text sequence.

As an optional embodiment, the encoder includes a self-attention model.

As an optional embodiment, the second classifier is determined based on a statistical machine learning model.

As an optional embodiment, the second classifier is obtained by training a parameter space of the second classifier using a second training set, where the second training set is determined according to result sets output by the plurality of first classifiers.

As an optional embodiment, the second training set is determined by:

- splitting the training set to obtain k subsets, where k is an integer greater than or equal to 1;
- determining a first training set and a first test set corresponding to each first classifier according to the k subsets;
- re-training the each first classifier using the first training set corresponding to the each first classifier, to obtain a trained first classifier;
- predicting the trained first classifier using the first test set corresponding to the each first classifier, to obtain a prediction result set corresponding to the each first classifier;
- determining the second training set of the second classifier according to prediction result sets respectively corresponding to the plurality of first classifiers.

As an optional embodiment, the determining the first training set and the first test set corresponding to the each first classifier according to the k subsets, includes:

- for the each first classifier, selecting k−1 subsets from the k subsets as a first training set corresponding to the first classifier, and taking one subset other than the k−1 subsets as a first test set corresponding to the first classifier;
- where first training sets corresponding to different first classifiers are at least partially different, and first test sets corresponding to different first classifiers are different.

As an optional embodiment, the determining the second training set of the second classifier according to prediction result sets respectively corresponding to the plurality of first classifiers, includes:

horizontally splicing the prediction result sets respectively corresponding to the plurality of first classifiers to obtain spliced data, and determining the spliced data as the second training set.

In a second aspect, an embodiment of the present disclosure provides a text recognition model including a plurality of first classifiers and a second classifiers, where:

the plurality of first classifiers are configured to perform primary classification on an input to-be-recognized text to obtain a plurality of text features, where one of the first classifiers is configured to output one of the text features;

the second classifier is configured to perform secondary classification on an input spliced feature to obtain a text category corresponding to the to-be-recognized text, where the spliced feature is obtained by splicing the plurality of text features.

As an optional embodiment, any one of the first classifiers is determined based on a meta-classifier, where the plurality of first classifiers respectively correspond to local parameter spaces of different dimensions in a meta-parameter space of the meta-classifier; the meta-classifier includes an encoder for encoding a text to obtain a text encoding feature.

As an optional embodiment, the plurality of first classifiers are obtained by training local parameter spaces of different dimensions in the meta-parameter space of the meta-classifier using a training set.

As an optional embodiment, in a training process, local parameter spaces of different dimensions in the meta-parameter space are adjusted based on a loss function value, and when a parameter set obtained by the adjusting is an optimal parameter set, first classifiers respectively corresponding to the local parameter spaces of different dimensions are obtained.

As an optional embodiment, the loss function value is determined by:

inputting each training text sequence in the training set to the meta-classifier, to output a plurality of training text categories corresponding to the each training text sequence;

determining the loss function value according to the plurality of training text categories and a plurality of marked text categories corresponding to the each training text sequence.

As an optional embodiment, the encoder includes a self-attention model.

As an optional embodiment, the second classifier is determined based on a statistical machine learning model.

As an optional embodiment, the second classifier is obtained by training a parameter space of the second classifier using a second training set, where the second training set is determined according to result sets output by the plurality of first classifiers.

As an optional embodiment, the second training set is determined by:

splitting the training set to obtain k subsets, where k is an integer greater than or equal to 1;

determining a first training set and a first test set corresponding to each first classifier according to the k subsets;

re-training the each first classifier using the first training set corresponding to the each first classifier, to obtain a trained first classifier;

predicting the trained first classifier using the first test set corresponding to the each first classifier, to obtain a prediction result set corresponding to the each first classifier;

determining the second training set of the second classifier according to prediction result sets respectively corresponding to the plurality of first classifiers.

As an optional embodiment, the determining the first training set and the first test set corresponding to the each first classifier according to the k subsets, includes:

for the each first classifier, selecting k−1 subsets from the k subsets as a first training set corresponding to the first classifier, and taking one subset other than the k−1 subsets as a first test set corresponding to the first classifier;

where first training sets corresponding to different first classifiers are at least partially different, and first test sets corresponding to different first classifiers are different.

As an optional embodiment, the determining the second training set of the second classifier according to prediction result sets respectively corresponding to the plurality of first classifiers, includes:

horizontally splicing the prediction result sets respectively corresponding to the plurality of first classifiers to obtain spliced data, and determining the spliced data as the second training set.

In a third aspect, an embodiment of the present disclosure further provides an electronic device, where the device includes a processor and a memory, the memory is configured to store programs executable by the processor, the processor is configured to read the programs in the memory and perform following steps:

acquiring a to-be-recognized text, performing primary classification on the to-be-recognized text to obtain a plurality of text features, where the primary classification is configured to perform feature extraction on the to-be-recognized text from different dimensions, and features extracted from different dimensions have differences;

splicing the plurality of text features to obtain a spliced feature; and performing secondary classification on the spliced feature to obtain a text category corresponding to the to-be-recognized text, where the secondary classification is configured to classify the spliced feature.

As an optional embodiment, the processor is specifically configured to perform:

inputting the to-be-recognized text into a plurality of first classifiers in a text recognition model for primary classification, to output the plurality of text features, where one of the first classifiers outputs one of the text features;

inputting the spliced feature obtained by splicing the plurality of text features into a second classifier in the text recognition model for secondary classification, to output the text category corresponding to the to-be-recognized text.

As an optional embodiment, any one of the first classifiers is determined based on a meta-classifier, where the plurality of first classifiers respectively correspond to local parameter spaces of different dimensions in a meta-parameter space of the meta-classifier; the meta-classifier includes an encoder for encoding a text to obtain a text encoding feature.

As an optional embodiment, the plurality of first classifiers are obtained by training local parameter spaces of different dimensions in the meta-parameter space of the meta-classifier using a training set.

As an optional embodiment, the processor is specifically configured to perform:

in a training process, adjusting local parameter spaces of different dimensions in the meta-parameter space based on a loss function value, and when a parameter set obtained by the adjusting is an optimal parameter set, obtaining first classifiers respectively corresponding to the local parameter spaces of different dimensions.

As an optional embodiment, the processor is specifically configured to determine the loss function value by:

inputting each training text sequence in the training set to the meta-classifier, to output a plurality of training text categories corresponding to the each training text sequence;

determining the loss function value according to the plurality of training text categories and a plurality of marked text categories corresponding to the each training text sequence.

As an optional embodiment, the encoder includes a self-attention model.

As an optional embodiment, the second classifier is determined based on a statistical machine learning model.

As an optional embodiment, the second classifier is obtained by training a parameter space of the second classifier using a second training set, where the second training set is determined according to result sets output by the plurality of first classifiers.

As an optional embodiment, the processor is specifically configured to determine the second training set by:

splitting the training set to obtain k subsets, where k is an integer greater than or equal to 1;

determining a first training set and a first test set corresponding to each first classifier according to the k subsets;

re-training the each first classifier using the first training set corresponding to the each first classifier, to obtain a trained first classifier;

predicting the trained first classifier using the first test set corresponding to the each first classifier, to obtain a prediction result set corresponding to the each first classifier;

determining the second training set of the second classifier according to prediction result sets respectively corresponding to the plurality of first classifiers.

As an optional embodiment, the processor is specifically configured to perform:

for the each first classifier, selecting k−1 subsets from the k subsets as a first training set corresponding to the first classifier, and taking one subset other than the k−1 subsets as a first test set corresponding to the first classifier;

where first training sets corresponding to different first classifiers are at least partially different, and first test sets corresponding to different first classifiers are different.

As an optional embodiment, the processor is specifically configured to perform:

horizontally splicing the prediction result sets respectively corresponding to the plurality of first classifiers to obtain spliced data, and determining the spliced data as the second training set.

In a fourth aspect, an embodiment of the present disclosure further provides a text recognition apparatus, the apparatus including:

a first recognition unit, configured to acquire a to-be-recognized text, perform primary classification on the to-be-recognized text to obtain a plurality of text features, where the primary classification is configured to perform feature extraction on the to-be-recognized text from different dimensions, and features extracted from different dimensions have differences;

a feature splicing unit, configured to splice the plurality of text features to obtain a spliced feature;

a second recognition unit, configured to perform secondary classification on the spliced feature to obtain a text category corresponding to the to-be-recognized text, where the secondary classification is configured to classify the spliced feature.

As an optional embodiment, the to-be-recognized text is input into a plurality of first classifiers in a text recognition model for primary classification, to output the plurality of text features, where one of the first classifiers outputs one of the text features; the spliced feature obtained by splicing the plurality of text features is input into a second classifier in the text recognition model for secondary classification, to output the text category corresponding to the to-be-recognized text.

As an optional embodiment, any one of the first classifiers is determined based on a meta-classifier, where the plurality of first classifiers respectively correspond to local parameter spaces of different dimensions in a meta-parameter space of the meta-classifier; the meta-classifier includes an encoder for encoding a text to obtain a text encoding feature.

As an optional embodiment, the plurality of first classifiers are obtained by training local parameter spaces of different dimensions in the meta-parameter space of the meta-classifier using a training set.

As an optional embodiment, the first recognition unit is specifically configured to:

in a training process, adjust local parameter spaces of different dimensions in the meta-parameter space based on a loss function value, and when a parameter set obtained by the adjusting is an optimal parameter set, obtain first classifiers respectively corresponding to the local parameter spaces of different dimensions.

As an optional embodiment, the first recognition unit is specifically configured to determine the loss function value by:

inputting each training text sequence in the training set to the meta-classifier, to output a plurality of training text categories corresponding to the each training text sequence;

determining the loss function value according to the plurality of training text categories and a plurality of marked text categories corresponding to the each training text sequence.

As an optional embodiment, the encoder includes a self-attention model.

As an optional embodiment, the second classifier is determined based on a statistical machine learning model.

As an optional embodiment, the second classifier is obtained by training a parameter space of the second classifier using a second training set, where the second training set is determined according to result sets output by the plurality of first classifiers.

As an optional embodiment, the first recognition unit is specifically configured to determine the second training set by:

splitting the training set to obtain k subsets, where k is an integer greater than or equal to 1;

determining a first training set and a first test set corresponding to each first classifier according to the k subsets;

re-training the each first classifier using the first training set corresponding to the each first classifier, to obtain a trained first classifier;

predicting the trained first classifier using the first test set corresponding to the each first classifier, to obtain a prediction result set corresponding to the each first classifier;

determining the second training set of the second classifier according to prediction result sets respectively corresponding to the plurality of first classifiers.

As an optional embodiment, the first recognition unit is specifically configured to:

for the each first classifier, select k−1 subsets from the k subsets as a first training set corresponding to the first classifier, and take one subset other than the k−1 subsets as a first test set corresponding to the first classifier;

where first training sets corresponding to different first classifiers are at least partially different, and first test sets corresponding to different first classifiers are different.

As an optional embodiment, the feature splicing unit is specifically configured to: horizontally splice the prediction result sets respectively corresponding to the plurality of first classifiers to obtain spliced data, and determine the spliced data as the second training set.

In a fifth aspect, an embodiment of the present disclosure further provides a computer storage medium storing computer programs thereon, where the programs, when executed by a processor, implement steps of the method according to the first aspect.

These and other aspects of the present disclosure will be more readily understood in the following description of embodiments.

BRIEF DESCRIPTION OF FIGURES

In order to more clearly illustrate technical solutions in embodiments of the present disclosure, the drawings that need to be used in the description of embodiments will be briefly introduced below. Obviously, the drawings in the following description are only some embodiments of the present disclosure. Those of ordinary skill in the art can also obtain other drawings based on these drawings without making creative efforts.

DETAILED DESCRIPTION

Figure 1:
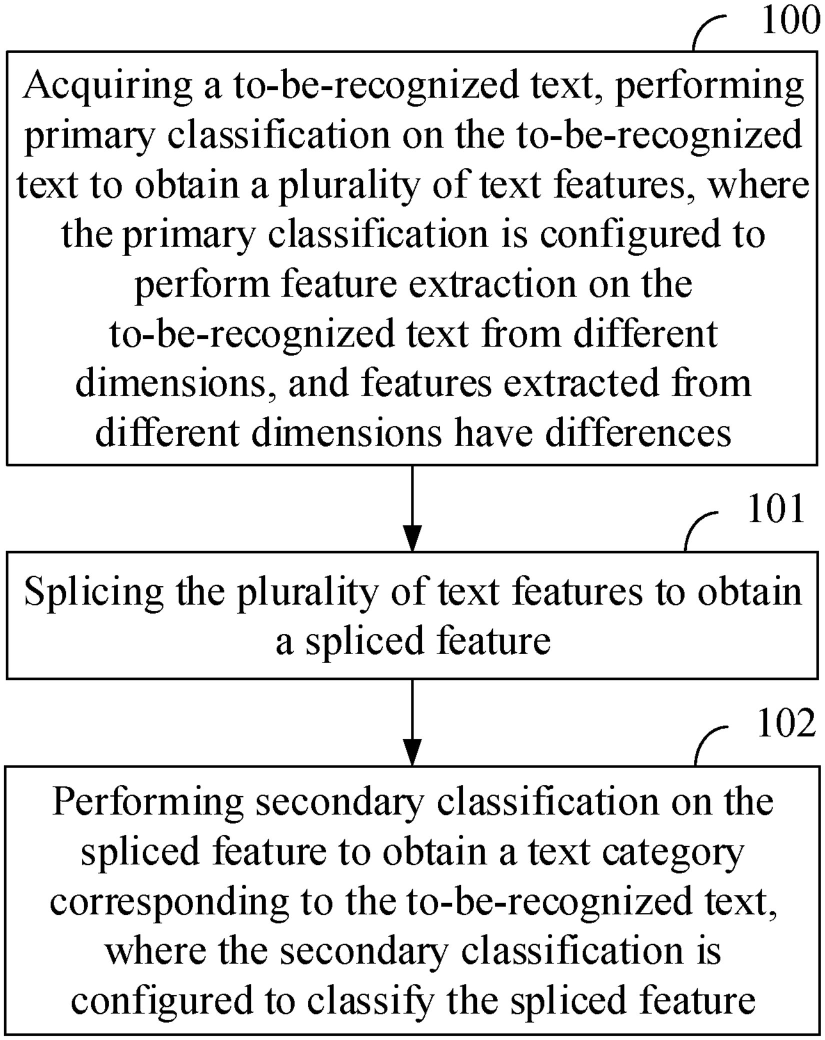
FIG. 1 is an implementation flow chart of a text recognition method according to an embodiment of the present disclosure.

In order to make the purpose, technical solutions and advantages of the present disclosure clearer, the present disclosure will be clearly and completely described below in conjunction with the accompanying drawings. Apparently, the described embodiments are some of embodiments of the present disclosure, not all of them. Based on the described embodiments of the present disclosure, all other embodiments obtained by the ordinary skilled in the art without creative effort fall within the protection scope of the present disclosure.

The term "and/or" in embodiments of the present disclosure describes an association relationship between associated objects, indicating that there may be three relationships, for example, A and/or B can represent three cases: A exists alone, A and B exist simultaneously, and B exists alone. The character "/" generally indicates that the relationship between associated objects is an "or" relationship.

Application scenarios described in embodiments of the present disclosure are intended to more clearly illustrate the technical solutions of the embodiments of the present disclosure, which do not constitute a limitation to the technical solutions according to embodiments of the present disclosure. The ordinary skilled in the art will know that, with the emergence of new application scenarios, the technical solutions according to embodiments of the present disclosure are also applicable to similar technical problems. In the description of the present disclosure, "a plurality" means two or more unless otherwise specified.

Embodiment 1 is as follows. Text recognition is the key to the composition of a man-machine dialogue system. Users can perform "Dialog Act" with the system by inputting a text, such as inquiring about weather, booking hotels, etc. "Conversation behavior" refers to the behavior that the state or context of the information shared by users in the conversation is constantly updated.

Text recognition is also called text classification, that is, the text is classified into previously defined text categories according to the domain and meaning of the text input by the users. There are some characteristics in text recognition, such as less annotation data, non-standard user expression, implicit and diversity of the text, etc. Therefore, the accuracy of traditional text recognition is generally low.

In the field of human-computer interaction, text recognition is to recognize dialogue texts input by the user, which is essentially a text classification problem. Accurate text recognition is the premise of human-computer interaction. Due to the emergence of Transformer which is a network framework with self-attention mechanism as its core, various network models that can be used for text recognition are emerging, such as Roberta, Bert and so on, pushing text recognition to a new level. However, there is still room for improvement, and the network structure provided by the present disclosure can further improve the performance of the pre-training model.

In order to improve the accuracy of text recognition, the present disclosure provides a text recognition method. The core idea is to use two text classifications for text recognition. Firstly, primary classification is performed on a to-be-recognized text to obtain a plurality of text features; secondly, secondary classification is performed on a spliced feature obtained by splicing the plurality of text features to obtain a final text category. Because the primary classification can classify the meaning of the to-be-recognized text from different dimensions, the text can be more accurately classified from various dimensions. Then the text features of various dimensions are spliced into a spliced feature for secondary classification, so that the input of the secondary classification has analyzed the text from various dimensions, and the final analysis result is used as the input of the secondary classification for re-classification, therefore the accuracy of the final text recognition is higher.

As shown in FIG. 1, a text recognition method according to an embodiment of the present disclosure can be applied to various fields such as human-computer interaction and multi-round dialogue, and the specific implementation process is as follows.

Step 100: acquiring a to-be-recognized text, performing primary classification on the to-be-recognized text to obtain a plurality of text features, where the primary classification is configured to perform feature extraction on the to-be-recognized text from different dimensions, and features extracted from different dimensions have differences.

In some embodiments, the user may directly input the to-be-recognized text, and the to-be-recognized text input by the user is directly acquired. The user may also input voice, and the input voice is analyzed to obtain a to-be-recognized text. In the embodiments, how to obtain the to-be-recognized text is not limited too much.

In an implementation, the primary classification in the embodiments can output a plurality of results, and each result corresponds to a text feature. Each text feature corresponds to a feature of a dimension, and features extracted from different dimensions have differences. The dimension in the embodiments represents a dimension in a parameter space corresponding to a classification algorithm or classification model used when the primary classification is performed, and can be understood as a parameter matrix in different dimensions of the parameter space.

Step 101: splicing the plurality of text features to obtain a spliced feature.

In some embodiments, the present disclosure horizontally splices a plurality of text features to obtain a spliced feature. It should be noted that the purpose of splicing in the embodiments is to fuse various text features, so that the meaning of the text can be more accurately expressed, and the accuracy of text recognition is improved. The spliced feature in the embodiments can also represent the feature and meaning of the text more comprehensively and completely.

Step 102: performing secondary classification on the spliced feature to obtain a text category corresponding to the to-be-recognized text, where the secondary classification is configured to classify the spliced feature.

In some embodiments, the present embodiment may utilize a text recognition model to perform text recognition on the to-be-recognized text, to obtain a text category corresponding to the to-be-recognized text. The text recognition model in the embodiments includes a plurality of first classifiers and a second classifier(s), and the specific implementation steps are as follows.

The to-be-recognized text is input into the plurality of first classifiers in the text recognition model for primary classification, to output the plurality of text features, where one of the first classifiers outputs one of the text features.

The spliced feature obtained by splicing the plurality of text features is input into the second classifier in the text recognition model for secondary classification, to output the text category corresponding to the to-be-recognized text.

In some embodiments, any one of the first classifiers in the embodiments is determined based on a meta-classifier. The plurality of first classifiers respectively correspond to local parameter spaces of different dimensions in a meta-parameter space of the meta-classifier. Through the plurality of first classifiers formed by different local parameter spaces, when the plurality of first classifiers perform the feature extraction on the text, differentiated features can be extracted, which is more conducive to improving the accuracy of text recognition.

It should be noted that network structures of the plurality of first classifiers in the embodiments are the same. Like the network structure of the meta-classifier, different first classifiers correspond to different local parameter spaces. The local parameter space corresponding to each first classifier is determined based on the meta-parameter space of the meta-classifier in the corresponding dimension.

Optionally, the meta-classifier in the embodiments includes one or more encoders for encoding a text to obtain a text encoding feature. Optionally, the meta-classifier in the embodiments may include a plurality of encoders, and the meta-classifier in the embodiments may be BERT. The encoder in the embodiments includes a self-attention model. Optionally, the meta-classifier in the embodiments includes a plurality of encoders based on a self-attention model. The first classifier in the embodiments includes a plurality of encoders based on a self-attention model.

In some embodiments, the meta-classifier includes an encoder and a fully connected layer. The fully connected layer is configured to perform dimension reduction processing on the text features output by the encoder so as to reduce the amount of computation, thereby improving recognition speed of the meta-classifier.

In some embodiments, the second classifier is determined based on a statistical machine learning model. The statistical machine learning model includes an ensemble tree model. The statistical machine learning model in the embodiments is different from a deep learning model. The statistical machine learning model is a model generated by a mathematical modeling method based on probability and statistics theory. The deep learning model is generated based on a neural network structure.

Optionally, the second classifier in the embodiments includes, but is not limited to, an ensemble tree model, such as an XGBoost (extreme Gradient Boosting) classifier. The secondary classifier in the embodiments may adopt XGBoost, and its characterization capability is generally stronger than that of SVM and random forest. At the same time, compared with the deep learning model, this model is more suitable for the fusion of discrete non-serialized features generated by the primary classifier and is not easy to over-fit.

Optionally, in the embodiments, a plurality of first classifiers and a second classifier are combined through a stacking structure to obtain a text recognition model. Here, the stacking refers to the technique that trains one model for combining other models. That is, a plurality of different models (i.e. first classifiers) are first trained, then a new model (i.e., the second classifier) is trained with the output of previously trained models (i.e., the spliced feature) as the input to get a final model (i.e., the text recognition model). For the ensemble learning model of the stacking structure, the greater the difference between base models is, the more obvious the performance of the ensemble model is improved relative to the single model. In order to construct base models with differences, several models with different parameters or structures are generally initialized directly, and then these models are trained separately.

In some embodiments, the plurality of first classifiers are obtained by training local parameter spaces of different dimensions in the meta-parameter space of the meta-classifier using a training set.

In some embodiments, in a training process of the meta-classifier, local parameter spaces of different dimensions in the meta-parameter space are adjusted based on a loss function value, and when a parameter set obtained by the adjusting is an optimal parameter set, first classifiers respectively corresponding to the local parameter spaces of different dimensions are obtained.

Optionally, a cosine learning rate is used in the training process, local parameter spaces of local regions respectively corresponding to a plurality of cosine periods in the meta-parameter space are adjusted based on the loss function value, optimal parameter sets respectively corresponding to the local parameter spaces are determined, and first classifiers respectively corresponding to the optimal parameter sets are determined according to the optimal parameter sets, where different cosine periods correspond to different local parameter spaces.

In an implementation, the cosine learning rate can be expressed by the following formula:

$$lr(\text{step}) = a * \left[\cos\left(\frac{pi}{2} * \frac{\text{step } \%\left(\frac{n}{m}\right)}{\frac{n}{m}} + 1\right)\right]. \quad \text{formula (1)}$$

Here, % ( ) represents performing remainder operations on the content in parentheses, lr(step) represents the cosine learning rate, a is a preset value, n represents the total number of training, $batch_{size}$ represents the number of samples input to the model (meta-classifier) per training, and m represents the number of first classifiers; step represents the serial number of the current training times, and the value range is [0, n−1].

In some embodiments, the loss function value is determined by:

- inputting each training text sequence in the training set to the meta-classifier, to output a plurality of training text categories corresponding to the each training text sequence;
- determining the loss function value according to the plurality of training text categories and a plurality of marked text categories corresponding to the each training text sequence.

It should be noted that the cosine learning rate is a method to adjust the learning rate in the training process. Different from the traditional learning rate, with the increase of time (epoch), the learning rate decreases rapidly at first, and then increases sharply. This process is then repeated over and over again, and the purpose of such violent fluctuations is to escape from the current optimal point. In the embodiments, the cosine learning rate with periodic change is adopted, so that the local region can be jumped out using the large learning rate before each period starts, and then the optimal point of the current local region is searched using the smaller learning rate in the later period, to obtain a plurality of differentiated first classifiers.

Figure 2:
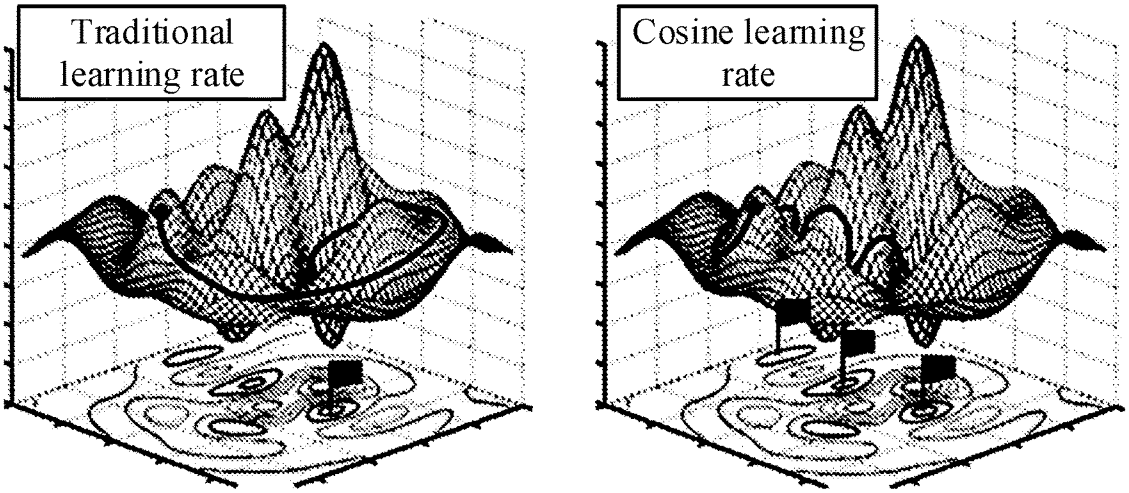
FIG. 2 is a schematic comparison diagram of a traditional learning rate and a cosine learning rate according to an embodiment of the present disclosure.

As shown in FIG. 2, this embodiment provides a schematic comparison diagram of a traditional learning rate and a cosine learning rate, where the left figure shows the traditional learning rate. In the traditional training process, the traditional learning rate gradually decreases, and the model gradually finds the local optimal point. Because the initial learning rate is large, the model does not step into a steep local optimal point. Instead, the model moves rapidly toward a flat local optimal point. As the learning rate gradually decreases, the model eventually converges to a better optimal point. The right figure shows the cosine learning rate. Because the cosine learning rate drops rapidly, the model may quickly step into a local optimal point (whether steep or not), and store the model of the local optimal point (i.e., store the first classifier corresponding to the optimal parameter set of the local parameter space). After the model is stored, the learning rate is restored to a larger value, the current local optimal point is escaped, and a new optimal point is searched, so that first classifiers respectively corresponding to the optimal parameter sets are determined according to the optimal parameter sets of the local parameter spaces respectively corresponding to the plurality of local regions. Because the models of different local optimal points have greater diversity, the effect may be better after integrating the plurality of first classifiers.

Traditional training generally finds a relative global optimal point in the parameter space. However, in the process of finding, many local optimal points may be ignored. These local optimal points generally also correspond to effective models with significant differences. The cosine learning rate can find a plurality of effective models with differences.

Optionally, the number of the first classifiers in the embodiments is determined according to the period of the cosine learning rate. For example, the period of the cosine learning rate is set to 5, and then five differentiated first classifiers are obtained after training the meta-classifier using the cosine learning rate.

Figure 3:
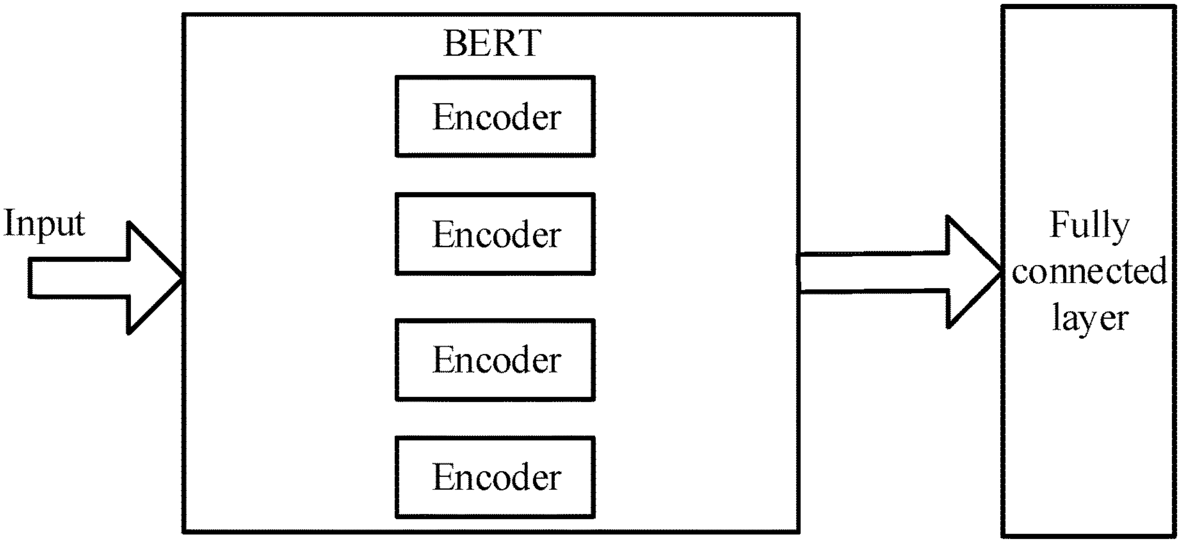
FIG. 3 is a schematic diagram of a structural framework of a meta-classifier according to an embodiment of the present disclosure.

In some embodiments, the meta-classifier in the embodiments includes a BERT and a fully connected layer. Optionally, the BERT in the embodiments includes a plurality of encoders. As shown in FIG. 3, this embodiment provides a schematic diagram of a structural framework of a meta-classifier. The BERT includes four encoders. Only a feature vector corresponding to a special placeholder (CLS) in the output of the BERT is selected, and the feature vector corresponding to the CLS is input to the fully connected layer.

In an implementation, the loss function value is determined as follows.

(1) After each training text sequence in a training set is added with a special placeholder, the special placeholder is input into a BERT, to output a feature vector corresponding to the special placeholder, where the special placeholder represents a global feature of each training text sequence.

In an implementation, two special placeholders (including CLS and SET) can be added to the input training text sequence and then input to the BERT. A feature vector corresponding to the special placeholder CLS can be selected from the output feature vectors. Since the special placeholder CLS can represent the global feature of the training text sequence, only the feature vector corresponding to the special placeholder is output to reduce computation amount.

(2) A feature vector corresponding to the special placeholder is input to a fully connected layer, to output a plurality of training text categories corresponding to the each training text sequence.

(3) The loss function value is determined according to the plurality of training text categories and a plurality of marked text categories corresponding to the each training text sequence.

Each training text sequence in the training set is marked with a text category, i.e., a corresponding marked text category. Therefore, the loss function value can be calculated according to the comparison between the training text category actually output in the training process and the marked text category. Parameter sets of a plurality of local parameter spaces in the meta-parameter space are adjusted using the loss function value, and a cosine learning rate is used when adjusting the parameter sets of the local parameter spaces. Optimal parameter sets of local parameter spaces corresponding to a plurality of local regions in the local regions respectively corresponding to a plurality of cosine periods are determined, thereby obtaining a plurality of first classifiers corresponding to a plurality of optimal parameter sets.

For example, for the Bert model, training generally takes a lot of time. To save the training time of the Bert model, generally, the purpose of training the model is to find the global optimal point of the loss function in the parameter space of the model. In the process of finding, many local optimal points may be ignored. These local optimal points generally correspond to effective models with obvious differences. Therefore, models corresponding to these local optimal points can be used as the first classifiers. In order to search for the local optimal point, the present disclosure uses a cosine learning rate with a periodic change to train a Bert model. In this way, the larger learning rate endowed by the cosine function at the beginning of each period in the training process can help the Bert model to jump out of the local region, then the smaller learning rate can help the model to find the local optimal point in the current local region, i.e., the optimal parameter set of the local parameter space.

Optionally, the first classifier in the embodiments adopts a Bert large pre-training model based on Transformer, and has stronger representation ability and can directly output sentence-level semantics, compared with the traditional models such as Lstm, word2vec. The construction of the first classifier adopts a snapshot method, and for a large model such as Bert, only one time of training is needed to obtain n first classifiers with differences, shortening the construction time.

In some embodiments, the second classifier in the embodiments is obtained by training a parameter space of the second classifier using a second training set. The second training set is determined according to result sets output by the plurality of first classifiers.

In some embodiments, this embodiment may determine the second training set as follows.

a) The training set is split to obtain k subsets, where k is an integer greater than or equal to 1.

b) A first training set and a first test set corresponding to each first classifier are determined according to the k subsets.

In some embodiments, the first training set and the first test set are determined as follows.

For the each first classifier, k−1 subsets are selected from the k subsets as a first training set corresponding to the first classifier, and one subset other than the k−1 subsets is taken as a first test set corresponding to the first classifier.

First training sets corresponding to different first classifiers are at least partially different, and first test sets corresponding to different first classifiers are different.

c) The each first classifier is re-trained using the first training set corresponding to the each first classifier, to obtain a trained first classifier.

d) The trained first classifier is predicted using the first test set corresponding to the each first classifier, to obtain a prediction result set corresponding to the each first classifier.

e) The second training set of the second classifier is determined according to prediction result sets respectively corresponding to the plurality of first classifiers.

In some embodiments, the prediction result sets respectively corresponding to the plurality of first classifiers are horizontally spliced to obtain spliced data, and the spliced data is determined as the second training set.

Figure 4:
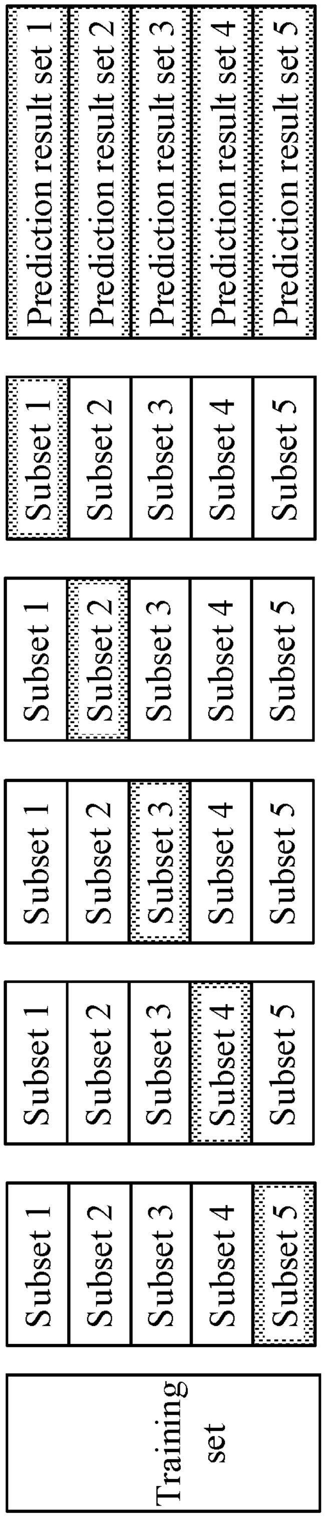
FIG. 4 is a schematic diagram of training and prediction of first classifiers according to an embodiment of the present disclosure.

As shown in FIG. 4, this embodiment further provides a schematic diagram of training and prediction of first classifiers. Taking five first classifiers as an example, the training set is split into five subsets as follows.

The first first classifier uses subset 1, subset 2, subset 3, and subset 4 as the first training set, and subset 5 as the first test set. The first classifier is predicted through the subset 5 to obtain the prediction result set 5.

The second first classifier uses subset 1, subset 2, subset 3, and subset 5 as the first training set, and subset 4 as the first test set. The first classifier is predicted through the subset 4 to obtain the prediction result set 4.

The third first classifier uses subset 1, subset 2, subset 4, and subset 5 as the first training set, and subset 3 as the first test set. The first classifier is predicted through the subset 3 to obtain the prediction result set 3.

The fourth first classifier uses subset 1, subset 3, subset 4, and subset 5 as the first training set, and subset 2 as the first test set. The first classifier is predicted through the subset 2 to obtain the prediction result set 2.

The fifth first classifier uses subset 2, subset 3, subset 4, and subset 5 as the first training set, and subset 1 as the first test set. The first classifier is predicted through the subset 1 to obtain the prediction result set 1.

The prediction result set 1, the prediction result set 2, the prediction result set 3, the prediction result set 4, and the prediction result set 5 are horizontally spliced to obtain spliced data, and the second classifier is trained using the spliced data to obtain a trained second classifier.

In some embodiments, after the plurality of first classifiers are obtained by training the parameter spaces of the meta-classifier using the training set, the method further includes:

determining a first training set and a first test set corresponding to each first classifier using a k-fold cross validation method, where k is an integer greater than or equal to 1;

re-training the each first classifier using the first training set corresponding to the each first classifier, to obtain a trained first classifier;

predicting the trained first classifier using the first test set corresponding to the each first classifier, to obtain a prediction result set corresponding to the each first classifier;

determining the second training set of the second classifier according to prediction result sets respectively corresponding to the plurality of first classifiers.

The second classifier is trained using the second training set to obtain a trained second classifier, and the text recognition model is determined according to the plurality of trained first classifiers and the trained second classifier.

It should be noted that cross validation is mainly used to prevent over-fitting caused by too complex models, which is a statistical method to evaluate the data set generalization ability of training data. The basic idea is to divide the original data into a training set and a test set, and the training set is used to train the model. The test set is used to test the trained model, which is used as an evaluation index of the model. The k-fold cross validation means that the original data D (i.e., the training set in the embodiments) is randomly divided into k parts, (k−1) parts are selected each time as the training set (i.e. the first training set in the embodiments), the remaining one (red part) is used as the test set (i.e., the first test set in the embodiments). The cross validation is repeated for k times, and the average of the accuracy of k times is taken as the evaluation index of the final model. Overfitting and underfitting can be effectively avoided, and the selection of k value can be adjusted according to the actual situation.

This embodiment is used for first performing the primary classification of different dimensions and then performing the secondary classification. The meaning or features of the text are analyzed from different dimensions, and then the analysis results of different dimensions are integrated. The real text meaning of the user is determined according to the integration result, so that the accuracy of text recognition is improved. A plurality of first classifiers may also be generated according to the meta-classifier, and a plurality of first classifiers and a second classifier are integrated into a text recognition model. In an implementation, a plurality of first classifiers are generated in the process of training a single meta-classifier through the snapshot ensembles method. Then primary classification is performed using the plurality of first classifiers, the secondary classification is performed on the spliced feature obtained by splicing the plurality of text features using the second classifier, and the plurality of first classifiers and the second classifier are combined using a stacking structure to generate an integrated classifier with stronger performance, i.e., the text recognition model. The text recognition model is used for performing text recognition on the input text using the text recognition model integrated by the plurality of first classifiers and the second classifier, to improve the accuracy of text recognition.

Based on the same inventive concept, an embodiment of the present disclosure further provides a text recognition model. Since the model is the model in the method in embodiments of the present disclosure, and the principle of solving problems by the model is similar to that of the method, the implementation of the model can be referred to the implementation of the method, and the repetition will not be repeated.

Figure 5:
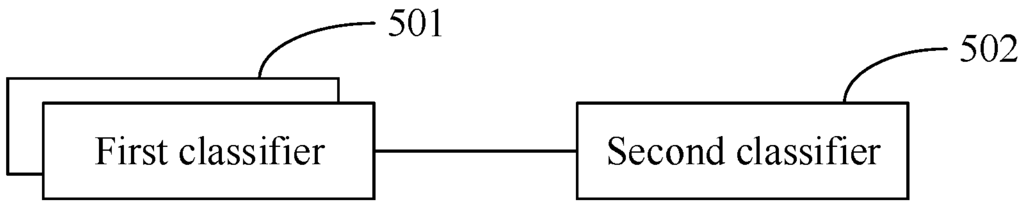
FIG. 5 is a schematic diagram of a text recognition model according to an embodiment of the present disclosure.

As shown in FIG. 5, this embodiment provides a text recognition model including a plurality of first classifiers 501 and a second classifier 502.

The plurality of first classifiers 501 are configured to perform primary classification on an input to-be-recognized text to obtain a plurality of text features, where one of the first classifiers is configured to output one of the text features.

The second classifier 502 is configured to perform secondary classification on an input spliced feature to obtain a text category corresponding to the to-be-recognized text, where the spliced feature is obtained by splicing the plurality of text features.

Optionally, in the embodiments, the plurality of first classifiers 501 and the second classifier 502 are combined through a stacking structure to obtain a text recognition model. Here, the stacking refers to the technique that trains one model for combining other models. That is, a plurality of different models (i.e., the first classifiers 501) are first trained, then a new model (i.e., the second classer 502) is trained with the output of previously trained models (i.e., the spliced feature) as the input to get a final model (i.e., the text recognition model).

As an optional embodiment, any one of the first classifiers 501 is determined based on a meta-classifier, where the plurality of first classifiers 501 respectively correspond to local parameter spaces of different dimensions in a meta-parameter space of the meta-classifier; the meta-classifier includes an encoder for encoding a text to obtain a text encoding feature.

As an optional embodiment, the plurality of first classifiers 501 are obtained by training local parameter spaces of different dimensions in the meta-parameter space of the meta-classifier using a training set.

As an optional embodiment, in a training process, local parameter spaces of different dimensions in the meta-parameter space are adjusted based on a loss function value, and when a parameter set obtained by the adjusting is an optimal parameter set, first classifiers 501 respectively corresponding to the local parameter spaces of different dimensions are obtained.

As an optional embodiment, the loss function value is determined by:

inputting each training text sequence in the training set to the meta-classifier, to output a plurality of training text categories corresponding to the each training text sequence;

determining the loss function value according to the plurality of training text categories and a plurality of marked text categories corresponding to the each training text sequence.

As an optional embodiment, the encoder includes a self-attention model.

As an optional embodiment, the second classifier 502 is determined based on a statistical machine learning model.

As an optional embodiment, the second classifier 502 is obtained by training a parameter space of the second classifier 502 using a second training set, where the second training set is determined according to result sets output by the first classifiers 501.

As an optional embodiment, the second training set is determined by:

splitting the training set to obtain k subsets, where k is an integer greater than or equal to 1;

determining a first training set and a first test set corresponding to each first classifier 501 according to the k subsets;

re-training the each first classifier 501 using the first training set corresponding to the each first classifier 501, to obtain a trained first classifier 501;

predicting the trained first classifier 501 using the first test set corresponding to the each first classifier 501, to obtain a prediction result set corresponding to the each first classifier 501;

determining the second training set of the second classifier 502 according to prediction result sets respectively corresponding to the plurality of first classifiers 501.

As an optional embodiment, the determining the first training set and the first test set corresponding to the each first classifier 501 according to the k subsets, includes:

for the each first classifier 501, selecting k−1 subsets from the k subsets as a first training set corresponding to the first classifier 501, and taking one subset other than the k−1 subsets as a first test set corresponding to the first classifier 501;

where first training sets corresponding to different first classifiers 501 are at least partially different, and first test sets corresponding to different first classifiers 501 are different.

As an optional embodiment, the determining the second training set of the second classifier 502 according to prediction result sets respectively corresponding to the plurality of first classifiers 501, includes:

horizontally splicing the prediction result sets respectively corresponding to the plurality of first classifiers 501 to obtain spliced data, and determining the spliced data as the second training set.

In the embodiments, a plurality of first classifiers are generated according to the meta-classifier, and a plurality of first classifiers and a second classifier are integrated into a text recognition model. In an implementation, a plurality of first classifiers are generated in the process of training a single meta-classifier through the snapshot ensembles method. Then primary classification is performed using the plurality of first classifiers, secondary classification is performed on the spliced feature obtained by splicing the plurality of text features using the second classifier, and the plurality of first classifiers and the second classifier are combined using a stacking structure to generate an integrated classifier with stronger performance, i.e., the text recognition model. The text recognition model is used for performing text recognition on the input text using the text recognition model integrated by the plurality of first classifiers and the second classifier, to improve the accuracy of text recognition.

Embodiment 2 is as follows. Based on the same inventive concept, an embodiment of the present disclosure further provides an electronic device. Since the device is the device in the method in embodiments of the present disclosure, and the principle of solving problems by the device is similar to that of the method, the implementation of the device can be referred to the implementation of the method, and the repetition is not repeated.

Figure 6:
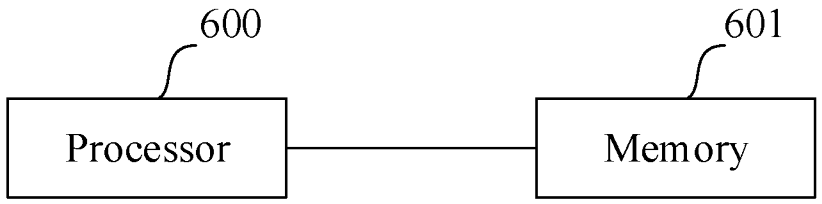
FIG. 6 is a schematic diagram of an electronic device according to an embodiment of the present disclosure.

As shown in FIG. 6, the device includes a processor 600 and a memory 601. The memory 601 is configured to store programs executable by the processor 600. The processor 600 is configured to read the programs in the memory 601 and perform following steps:

acquiring a to-be-recognized text, performing primary classification on the to-be-recognized text to obtain a plurality of text features, where the primary classification is configured to perform feature extraction on the to-be-recognized text from different dimensions, and features extracted from different dimensions have differences;

splicing the plurality of text features to obtain a spliced feature;

performing secondary classification on the spliced feature to obtain a text category corresponding to the to-be-recognized text, where the secondary classification is configured to classify the spliced feature.

As an optional embodiment, the processor 600 is specifically configured to perform:

inputting the to-be-recognized text into a plurality of first classifiers in a text recognition model for primary classification, to output the plurality of text features, where one of the first classifiers outputs one of the text features;

inputting the spliced feature obtained by splicing the plurality of text features into a second classifier in the text recognition model for secondary classification, to output the text category corresponding to the to-be-recognized text.

As an optional embodiment, any one of the first classifiers is determined based on a meta-classifier, where the plurality of first classifiers respectively correspond to local parameter spaces of different dimensions in a meta-parameter space of the meta-classifier; the meta-classifier includes an encoder for encoding a text to obtain a text encoding feature.

As an optional embodiment, the plurality of first classifiers are obtained by training local parameter spaces of different dimensions in the meta-parameter space of the meta-classifier using a training set.

As an optional embodiment, the processor 600 is specifically configured to perform:

in a training process, adjusting local parameter spaces of different dimensions in the meta-parameter space based on a loss function value, and when a parameter set obtained by the adjusting is an optimal parameter set, obtaining first classifiers respectively corresponding to the local parameter spaces of different dimensions.

As an optional embodiment, the processor 600 is specifically configured to determine the loss function value by:

inputting each training text sequence in the training set to the meta-classifier, to output a plurality of training text categories corresponding to the each training text sequence;

determining the loss function value according to the plurality of training text categories and a plurality of marked text categories corresponding to the each training text sequence.

As an optional embodiment, the encoder includes a self-attention model.

As an optional embodiment, the second classifier is determined based on a statistical machine learning model.

As an optional embodiment, the second classifier is obtained by training a parameter space of the second classifier using a second training set, where the second training set is determined according to result sets output by the plurality of first classifiers.

As an optional embodiment, the processor 600 is specifically configured to determine the second training set by:

splitting the training set to obtain k subsets, where k is an integer greater than or equal to 1;

determining a first training set and a first test set corresponding to each first classifier according to the k subsets;

re-training the each first classifier using the first training set corresponding to the each first classifier, to obtain a trained first classifier;

predicting the trained first classifier using the first test set corresponding to the each first classifier, to obtain a prediction result set corresponding to the each first classifier;

determining the second training set of the second classifier according to prediction result sets respectively corresponding to the plurality of first classifiers.

As an optional embodiment, the processor 600 is specifically configured to perform:

for the each first classifier, selecting k−1 subsets from the k subsets as a first training set corresponding to the first classifier, and taking one subset other than the k−1 subsets as a first test set corresponding to the first classifier;

where first training sets corresponding to different first classifiers are at least partially different, and first test sets corresponding to different first classifiers are different.

As an optional embodiment, the processor 600 is specifically configured to perform:

horizontally splicing the prediction result sets respectively corresponding to the plurality of first classifiers to obtain spliced data, and determining the spliced data as the second training set.

Embodiment 3 is as follows. Based on the same inventive concept, an embodiment of the present disclosure further provides a text recognition apparatus. Since the apparatus is the apparatus in the method in embodiments of the present disclosure, and the principle of solving problems by the apparatus is similar to that of the method, the implementation of the apparatus can be referred to the implementation of the method, and the repetition is not repeated.

Figure 7:
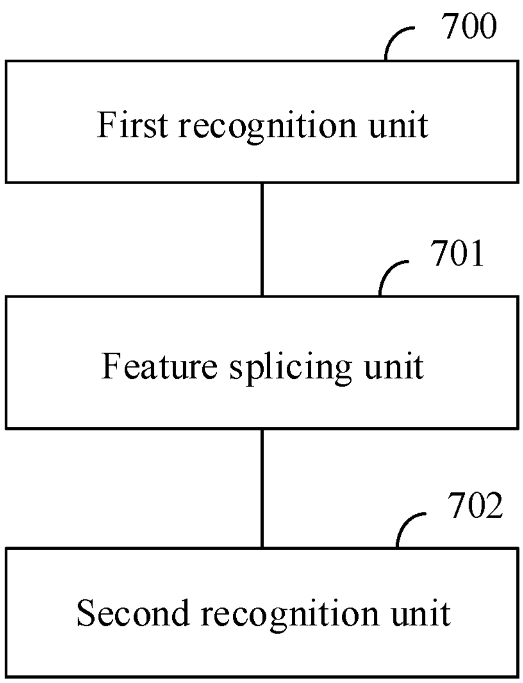
FIG. 7 is a schematic diagram of a text recognition apparatus according to an embodiment of the present disclosure.

As shown in FIG. 7, the apparatus includes:

a first recognition unit 700, configured to acquire a to-be-recognized text, perform primary classification on the to-be-recognized text to obtain a plurality of text features, where the primary classification is configured to perform feature extraction on the to-be-recognized text from different dimensions, and features extracted from different dimensions have differences;

a feature splicing unit 701, configured to splice the plurality of text features to obtain a spliced feature;

a second recognition unit 702, configured to perform secondary classification on the spliced feature to obtain a text category corresponding to the to-be-recognized text, where the secondary classification is configured to classify the spliced feature.

As an optional embodiment, the to-be-recognized text is input into a plurality of first classifiers in a text recognition model for primary classification, to output the plurality of text features, where one of the first classifiers outputs one of the text features; the spliced feature obtained by splicing the plurality of text features is input into a second classifier in the text recognition model for secondary classification, to output the text category corresponding to the to-be-recognized text.

As an optional embodiment, any one of the first classifiers is determined based on a meta-classifier, where the plurality of first classifiers respectively correspond to local parameter spaces of different dimensions in a meta-parameter space of the meta-classifier; the meta-classifier includes an encoder for encoding a text to obtain a text encoding feature.

As an optional embodiment, the plurality of first classifiers are obtained by training local parameter spaces of different dimensions in the meta-parameter space of the meta-classifier using a training set.

As an optional embodiment, the first recognition unit 700 is specifically configured to:

in a training process, adjust local parameter spaces of different dimensions in the meta-parameter space based on a loss function value, and when a parameter set obtained by the adjusting is an optimal parameter set, obtain first classifiers respectively corresponding to the local parameter spaces of different dimensions.

As an optional embodiment, the first recognition unit 700 is specifically configured to determine the loss function value by:

inputting each training text sequence in the training set to the meta-classifier, to output a plurality of training text categories corresponding to the each training text sequence;

determining the loss function value according to the plurality of training text categories and a plurality of marked text categories corresponding to the each training text sequence.

As an optional embodiment, the encoder includes a self-attention model.

As an optional embodiment, the second classifier is determined based on a statistical machine learning model.

As an optional embodiment, the second classifier is obtained by training a parameter space of the second classifier using a second training set, where the second training set is determined according to result sets output by the plurality of first classifiers.

As an optional embodiment, the first recognition unit 700 is specifically configured to determine the second training set by:

splitting the training set to obtain k subsets, where k is an integer greater than or equal to 1;

determining a first training set and a first test set corresponding to each first classifier according to the k subsets;

re-training the each first classifier using the first training set corresponding to the each first classifier, to obtain a trained first classifier;

predicting the trained first classifier using the first test set corresponding to the each first classifier, to obtain a prediction result set corresponding to the each first classifier;

determining the second training set of the second classifier according to prediction result sets respectively corresponding to the plurality of first classifiers.

As an optional embodiment, the first recognition unit 700 is specifically configured to:

for the each first classifier, select k−1 subsets from the k subsets as a first training set corresponding to the first classifier, and take one subset other than the k−1 subsets as a first test set corresponding to the first classifier;

where first training sets corresponding to different first classifiers are at least partially different, and first test sets corresponding to different first classifiers are different.

As an optional embodiment, the first recognition unit 700 is specifically configured to:

horizontally splice the prediction result sets respectively corresponding to the plurality of first classifiers to obtain spliced data, and determine the spliced data as the second training set.

Based on the same inventive concept, an embodiment of the present disclosure further provides a computer storage medium storing computer programs thereon, where the programs, when executed by a processor, implement following steps:

acquiring a to-be-recognized text, performing primary classification on the to-be-recognized text to obtain a plurality of text features, where the primary classification is configured to perform feature extraction on the to-be-recognized text from different dimensions, and features extracted from different dimensions have differences;

splicing the plurality of text features to obtain a spliced feature;

performing secondary classification on the spliced feature to obtain a text category corresponding to the to-be-recognized text, where the secondary classification is configured to classify the spliced feature.

Those skilled in the art should understand that embodiments of the present disclosure can be provided as methods, systems or computer program products. Therefore, the present disclosure can adopt forms of full hardware embodiments, full software embodiments, or embodiments combining software and hardware aspects. Moreover, the present disclosure can adopt a form of the computer program products implemented on one or more computer available storage mediums (including but not limited to a disk memory, an optical memory and the like) containing computer available program codes.

The present disclosure is described with reference to flow charts and/or block diagrams of the methods, the equipment (systems), and the computer program products according to embodiments of the present disclosure. It should be understood that each flow and/or block in the flow charts and/or the block diagrams and combinations of the flows and/or the blocks in the flow charts and/or the block diagrams can be implemented by computer program instructions. The computer program instructions may be provided to a processor of a general-purpose computer, a special-purpose computer, an embedded processing machine or other programmable data processing equipment, thereby generating a machine, such that the instructions, when executed by the processor of the computers or other programmable data processing equipment, generate devices for implementing functions specified in one or more flows in the flow charts and/or one or more blocks in the block diagrams.

The computer program instructions may also be stored in a computer readable memory which can guide the computers or other programmable data processing equipment to work in a specific mode, thus the instructions stored in the computer readable memory generates an article of manufacture that includes a commander device that implement the functions specified in one or more flows in the flow charts and/or one or more blocks in the block diagrams.

The computer program instructions may also be loaded to the computers or other programmable data processing equipment, so that a series of operating steps may be executed on the computers or other programmable equipment to generate computer-implemented processing, such that the instructions executed on the computers or other programmable equipment provide steps for implementing the functions specified in one or more flows in the flow charts and/or one or more blocks in the block diagrams.

Obviously, those skilled in the art can make various modifications and variations to the present disclosure without departing from the spirit and scope of the present disclosure. In this way, if these modifications and variations of the present disclosure fall within the scope of the claims of the present disclosure and their equivalent art, the present disclosure also intends to include these modifications and variations.

What is claimed is:

1. A text recognition method, comprising:

acquiring a to-be-recognized text, performing primary classification on the to-be-recognized text to obtain a plurality of text features, wherein the primary classification is configured to perform feature extraction on the to-be-recognized text from different dimensions, and features extracted from different dimensions have differences;

splicing the plurality of text features to obtain a spliced feature;

performing secondary classification on the spliced feature to obtain a text category corresponding to the to-be-recognized text, wherein the secondary classification is configured to classify the spliced feature;

inputting the to-be-recognized text into a plurality of first classifiers in a text recognition device for primary classification, to output the plurality of text features, wherein one of the first classifiers outputs one of the text features;

inputting the spliced feature obtained by splicing the plurality of text features into a second classifier in the text recognition device for secondary classification, to output the text category corresponding to the to-be-recognized text; and determining any one of the first classifiers based on a meta-classifier;

wherein the plurality of first classifiers respectively correspond to local parameter spaces of different dimensions in a meta-parameter space of the meta-classifier; and the meta-classifier comprises an encoder for encoding a text to obtain a text encoding feature.

2. The method according to claim 1, further comprising:

obtaining the plurality of first classifiers by training the local parameter spaces of different dimensions in the meta-parameter space of the meta-classifier using a training set.

3. The method according to claim 2, further comprising:

in a training process, adjusting the local parameter spaces of different dimensions in the meta-parameter space based on a loss function value, and when a parameter set obtained by the adjusting is an optimal parameter set, obtaining the first classifiers respectively corresponding to the local parameter spaces of different dimensions.

4. The method according to claim 2, wherein the loss function value is determined by:

inputting each training text sequence in the training set to the meta-classifier, to output a plurality of training text categories corresponding to the each training text sequence; and determining the loss function value according to the plurality of training text categories and a plurality of marked text categories corresponding to the each training text sequence.

5. The method according to claim 1, wherein the second classifier is determined based on a statistical machine learning model;

wherein the method further comprises:

obtaining the second classifier by training a parameter space of the second classifier using a second training set, wherein the second training set is determined according to result sets output by the plurality of first classifiers.

6. The method according to claim 5, wherein the second training set is determined by:

splitting the training set to obtain k subsets, wherein k is an integer greater than or equal to 1;

determining a first training set and a first test set corresponding to each first classifier according to the k subsets;

re-training the each first classifier using the first training set corresponding to the each first classifier, to obtain a trained first classifier;

predicting the trained first classifier using the first test set corresponding to the each first classifier, to obtain a prediction result set corresponding to the each first classifier; and determining the second training set of the second classifier according to prediction result sets respectively corresponding to the plurality of first classifiers.

7. The method according to claim 6, wherein the determining the first training set and the first test set corresponding to the each first classifier according to the k subsets, comprises:

for the each first classifier, selecting k−1 subsets from the k subsets as a first training set corresponding to the first classifier, and taking one subset other than the k−1 subsets as the first test set corresponding to the first classifier;

wherein first training sets corresponding to different first classifiers are at least partially different, and first test sets corresponding to different first classifiers are different.

8. The method according to claim 6, wherein the determining the second training set of the second classifier according to the prediction result sets respectively corresponding to the plurality of first classifiers, comprises:

horizontally splicing the prediction result sets respectively corresponding to the plurality of first classifiers to obtain spliced data, and determining the spliced data as the second training set.

9. A text recognition device, comprising:

a memory, configured to store computer instructions; and at least one processor, connected to the memory, and configured to read and execute the computer instructions to:

control a plurality of first classifiers to perform primary classification on an input to-be-recognized text to obtain a plurality of text features, wherein one of the first classifiers is configured to output one of the text features;

control a second classifier to perform secondary classification on an input spliced feature to obtain a text category corresponding to the to-be-recognized text, wherein the spliced feature is obtained by splicing the plurality of text features;

determine any one of the first classifiers based on a meta-classifier;

wherein the plurality of first classifiers respectively correspond to local parameter spaces of different dimensions in a meta-parameter space of the meta-classifier; and the meta-classifier comprises an encoder for encoding a text to obtain a text encoding feature.

10. The text recognition device according to claim 9, wherein the at least one processor is configured to read and execute the computer instructions to:

train the local parameter spaces of different dimensions in the meta-parameter space of the meta-classifier using a training set to obtain the plurality of first classifiers.

11. The text recognition device according to claim 10, wherein the at least one processor is configured to read and execute the computer instructions to:

in a training process, adjust local parameter spaces of different dimensions in the meta-parameter space based on a loss function value, and when a parameter set obtained by the adjusting is an optimal parameter set, obtain the first classifiers respectively corresponding to the local parameter spaces of different dimensions.

12. The text recognition device according to claim 10, wherein the at least one processor is configured to read and execute the computer instructions to:

input each training text sequence in the training set to the meta-classifier, and output a plurality of training text categories corresponding to the each training text sequence; and determine the loss function value according to the plurality of training text categories and a plurality of marked text categories corresponding to the each training text sequence.

13. The text recognition device according to claim 9, wherein the at least one processor is configured to read and execute the computer instructions to:

determine the second classifier based on a statistical machine learning model;

determine a second training set according to result sets output by the plurality of first classifiers; and train a parameter space of the second classifier using the second training set to obtain the second classifier.

14. The text recognition device according to claim 13, wherein the at least one processor is configured to read and execute the computer instructions to:

split the training set to obtain k subsets, wherein k is an integer greater than or equal to 1;

determine a first training set and a first test set corresponding to each first classifier according to the k subsets;

re-train the each first classifier using the first training set corresponding to the each first classifier, to obtain a trained first classifier;

predict the trained first classifier using the first test set corresponding to the each first classifier, to obtain a prediction result set corresponding to the each first classifier; and determine the second training set of the second classifier according to prediction result sets respectively corresponding to the plurality of first classifiers.

15. The text recognition device according to claim 14, wherein the at least one processor is configured to read and execute the computer instructions to:

for the each first classifier, select k−1 subsets from the k subsets as a first training set corresponding to the first classifier, and take one subset other than the k−1 subsets as the first test set corresponding to the first classifier;

wherein first training sets corresponding to different first classifiers are at least partially different, and first test sets corresponding to different first classifiers are different; or horizontally splice the prediction result sets respectively corresponding to the plurality of first classifiers to obtain spliced data, and determine the spliced data as the second training set.

16. An electronic device, wherein the device comprises a processor and a memory, the memory is configured to store programs executable by the processor, and the processor is configured to read the programs in the memory and perform steps of the method according to claim 1.

17. A non-transitory computer storage medium storing computer programs thereon, wherein the programs, when executed by a processor, implement steps of the method according to claim 1.

* * * * *